(12) United States Patent
Xu et al.

(10) Patent No.: US 10,357,807 B2
(45) Date of Patent: Jul. 23, 2019

(54) INTELLIGENT HUB CLEANING DEVICE

(71) Applicant: CITIC Dicastal CO., LTD., Qinhuangdao, Hebei (CN)

(72) Inventors: Shiwen Xu, Qinhuangdao (CN); Ruixiao Zhou, Qinhuangdao (CN); Zhiyuan Yu, Qinhuangdao (CN); Minghua Liu, Qinhuangdao (CN)

(73) Assignee: CITIC Dicastal CO., LTD., Qinhuangdao, Hebei (CN)

( * ) Notice: Subject to any disclaimer, the term of this patent is extended or adjusted under 35 U.S.C. 154(b) by 0 days.

(21) Appl. No.: 15/797,436

(22) Filed: Oct. 30, 2017

(65) Prior Publication Data
US 2019/0060962 A1 Feb. 28, 2019

(30) Foreign Application Priority Data
Aug. 28, 2017 (CN) .......................... 2017 1 0748186

(51) Int. Cl.
*B08B 3/02* (2006.01)
*B08B 13/00* (2006.01)
*B60B 30/00* (2006.01)

(52) U.S. Cl.
CPC ............... *B08B 3/02* (2013.01); *B08B 13/00* (2013.01); *B60B 30/00* (2013.01); *B60B 2310/202* (2013.01); *B60B 2310/228* (2013.01); *B60B 2360/104* (2013.01)

(58) Field of Classification Search
CPC .. B60S 3/042; B60S 3/04; B60S 3/041; B60S 1/68; B08B 3/02; B08B 13/00; B08B 3/024; B08B 3/022; B05B 12/30; B05B 3/0463; B05B 13/0431

USPC ........ 134/113, 123, 45, 57 R, 172, 56 R, 18, 134/198, 58 R; 15/53.4, DIG. 2, 97.3, 15/53.1, 53.3, 268
See application file for complete search history.

(56) References Cited

U.S. PATENT DOCUMENTS

| | | | | |
|---|---|---|---|---|
| 2,692,214 A | * | 10/1954 | Hurst | B60S 3/042 134/123 |
| 2,716,772 A | * | 9/1955 | Cockrell | B60S 3/042 134/178 |
| 2,718,650 A | * | 9/1955 | Haverberg | B60S 3/042 134/123 |
| 2,761,170 A | * | 9/1956 | Bonneau | B60S 3/042 134/172 |
| 2,814,825 A | * | 12/1957 | Guthrie, Jr. | B60S 3/042 134/123 |

(Continued)

*Primary Examiner* — David G Cormier
*Assistant Examiner* — Thomas Bucci
(74) *Attorney, Agent, or Firm* — Cooper Legal Group, LLC

(57) ABSTRACT

Disclosed is a hub cleaning device, including a base (1), a mounting transition plate (2), a nozzle adjusting module (3), hub conveying modules (4) and a work fixture (5), in which the nozzle adjusting module (3) is connected onto the mounting transition plate (2), and the mounting transition plate (2) is fixed on the base (1); the work fixture (5) is arranged at a position parallel to the base (1), so that the nozzle adjusting module (3) can face the front side of a hub (6); and the hub conveying modules (4) are arranged on two sides of the work fixture (5). The device is simple in structure, and one device can complete cleaning of multiple types of hubs, thereby greatly reducing the input of enterprises on cleaning devices and saving a lot of money for the enterprises.

1 Claim, 5 Drawing Sheets

(56) References Cited

U.S. PATENT DOCUMENTS

| | | | | |
|---|---|---|---|---|
| 2,822,564 A | * | 2/1958 | Crivelli | B60S 3/042 134/45 |
| 2,837,759 A | * | 6/1958 | Haverberg | B60S 3/042 134/123 |
| 2,857,605 A | * | 10/1958 | Weishaar | B60S 3/042 134/153 |
| 2,910,202 A | * | 10/1959 | Clarke | B60S 3/042 134/45 |
| 2,957,195 A | * | 10/1960 | Almond | B60S 3/042 134/123 |
| 3,043,317 A | * | 7/1962 | Hursen | C21D 1/667 134/102.1 |
| 3,058,133 A | * | 10/1962 | Haverberg | B60S 3/042 15/268 |
| 3,108,299 A | * | 10/1963 | Baldwin | B60S 3/042 134/123 |
| 3,191,207 A | * | 6/1965 | Van Brakel | B60S 3/042 134/123 |
| 3,305,886 A | * | 2/1967 | Fricke | B60S 3/042 15/53.4 |
| 3,328,819 A | * | 7/1967 | Doerschlag | B60S 3/042 15/53.4 |
| 3,433,236 A | * | 3/1969 | Long | B60S 3/042 134/126 |
| 3,446,217 A | * | 5/1969 | Collier | B60S 3/042 134/172 |
| 3,448,717 A | * | 6/1969 | Kuhlman | B05B 13/0405 118/315 |
| 3,517,405 A | * | 6/1970 | Ebeling | B60S 3/042 15/53.4 |
| 3,541,627 A | * | 11/1970 | Grant | B60S 3/042 15/53.4 |
| 3,561,031 A | * | 2/1971 | Gusse et al. | B60S 3/042 15/53.4 |
| 3,628,212 A | * | 12/1971 | Van Brakel | B60S 3/042 15/53.4 |
| 3,643,272 A | * | 2/1972 | Rickel | B60S 3/042 15/53.4 |
| 3,643,275 A | * | 2/1972 | Van Brakel | B60S 3/042 15/53.4 |
| 3,645,282 A | * | 2/1972 | Kurronen | B60S 3/04 134/172 |
| 3,729,763 A | * | 5/1973 | Coley | B60S 3/042 15/53.4 |
| 3,822,431 A | * | 7/1974 | Van Brakel | B60S 3/06 15/53.4 |
| 3,844,480 A | * | 10/1974 | Taylor | B60S 3/04 239/752 |
| 3,903,559 A | * | 9/1975 | Kuster | B60S 3/042 15/53.4 |
| 3,913,162 A | * | 10/1975 | Parkin | B60S 3/042 15/53.4 |
| 3,915,179 A | * | 10/1975 | Casson | B60S 3/042 134/45 |
| 4,023,228 A | * | 5/1977 | Hanna | B60S 3/042 15/53.4 |
| 4,178,948 A | * | 12/1979 | Swinehart | B60S 3/042 134/45 |
| 4,269,141 A | * | 5/1981 | Kennett | B60S 3/042 118/313 |
| 4,272,301 A | * | 6/1981 | Galbraith | B60C 25/00 134/123 |
| 4,424,823 A | * | 1/1984 | Gougoulas | B60S 3/042 134/100.1 |
| 4,550,464 A | * | 11/1985 | Messing | B60S 3/042 15/53.4 |
| 4,651,925 A | * | 3/1987 | Harris | B05B 3/0413 134/123 |
| 4,718,439 A | * | 1/1988 | Gorra | B60S 3/04 118/323 |
| 4,719,932 A | * | 1/1988 | Burton | B60S 3/04 134/123 |
| 4,726,388 A | * | 2/1988 | Swinehart | B60S 3/04 134/123 |
| 4,805,648 A | * | 2/1989 | Hour | A61L 2/18 134/100.1 |
| 4,830,033 A | * | 5/1989 | Hanna | B60S 3/042 134/123 |
| 4,870,921 A | * | 10/1989 | Svensson | B05B 15/62 118/676 |
| 4,878,262 A | * | 11/1989 | Stufflebeam | B60S 3/042 15/53.4 |
| 4,895,307 A | * | 1/1990 | Swinehart | B05B 3/12 134/123 |
| 4,920,997 A | * | 5/1990 | Vetter | B60S 3/04 134/123 |
| 4,946,513 A | * | 8/1990 | Del Prato | B60S 3/04 134/113 |
| 4,971,084 A | * | 11/1990 | Smith | B60S 3/042 134/123 |
| 4,979,536 A | * | 12/1990 | Midkiff | B60S 3/042 134/123 |
| 4,981,523 A | * | 1/1991 | Larson | B60S 3/04 134/172 |
| 4,985,957 A | * | 1/1991 | Belanger | B60S 3/042 134/123 |
| 5,016,662 A | * | 5/1991 | Crotts | B60S 3/04 134/123 |
| 5,033,490 A | * | 7/1991 | Wade | B60S 3/04 134/123 |
| 5,040,485 A | * | 8/1991 | Bailey | B60S 3/04 118/323 |
| 5,052,629 A | * | 10/1991 | Belanger | B60S 3/042 134/123 |
| 5,065,694 A | * | 11/1991 | Earnheart, Jr. | B05B 13/0228 118/669 |
| 5,090,429 A | * | 2/1992 | Barber | B60S 3/04 134/123 |
| 5,098,744 A | * | 3/1992 | Enegren | B08B 3/022 134/123 |
| 5,123,136 A | * | 6/1992 | Belanger | B60S 3/042 134/134 |
| 5,125,981 A | * | 6/1992 | Belanger | B60S 3/042 134/123 |
| 5,148,570 A | * | 9/1992 | Crotts | B60S 3/04 134/123 |
| 5,161,557 A | * | 11/1992 | Scheiter, Jr. | B60S 3/04 134/123 |
| 5,226,436 A | * | 7/1993 | Kirby | B60S 3/04 134/123 |
| 5,226,971 A | * | 7/1993 | Fogal | B08B 3/04 134/123 |
| 5,261,433 A | * | 11/1993 | Smith | B60S 3/042 134/123 |
| 5,266,123 A | * | 11/1993 | Brand | B60S 3/04 134/100.1 |
| 5,291,696 A | * | 3/1994 | Enegren | B08B 3/022 451/83 |
| 5,291,906 A | * | 3/1994 | White | B60S 3/04 134/123 |
| 5,309,931 A | * | 5/1994 | Meyer, III | B60S 3/042 134/123 |
| 5,341,828 A | * | 8/1994 | Ferguson, Sr. | B08B 3/022 134/123 |
| 5,432,974 A | * | 7/1995 | Yasutake | B60S 3/002 134/123 |
| 5,730,164 A | * | 3/1998 | Midkiff | B60S 3/042 134/104.2 |
| 5,778,908 A | * | 7/1998 | Shelstad | B60S 3/042 134/123 |
| 5,853,127 A | * | 12/1998 | Heembrock | B08B 3/02 239/227 |
| 5,911,259 A | * | 6/1999 | Baldi | B08B 5/02 15/303 |
| 5,968,271 A | * | 10/1999 | Maxwell | B05B 13/005 118/671 |
| 5,991,952 A | * | 11/1999 | Bintzler | B60S 3/006 104/307 |

(56) References Cited

U.S. PATENT DOCUMENTS

| | | | | |
|---|---|---|---|---|
| 6,082,634 | A * | 7/2000 | MacNeil | B05B 3/02 134/123 |
| 6,134,735 | A * | 10/2000 | Zamensky | B60S 3/04 134/123 |
| 6,260,225 | B1 * | 7/2001 | Bowman | B29D 30/0061 118/244 |
| 6,270,586 | B1 * | 8/2001 | Soble | B60S 3/042 134/123 |
| 6,277,207 | B1 * | 8/2001 | Gauthier | B60S 3/002 134/123 |
| 6,325,082 | B1 * | 12/2001 | Schlueter | B60S 3/041 134/116 |
| 6,358,330 | B1 * | 3/2002 | McGraw | B60S 3/042 134/104.4 |
| 6,372,053 | B1 * | 4/2002 | Belanger | B60S 3/04 134/123 |
| 6,383,295 | B1 * | 5/2002 | Frederick, Jr. | B60S 3/042 118/680 |
| 6,461,685 | B2 * | 10/2002 | Gorra | B60S 3/004 118/264 |
| 6,668,466 | B1 * | 12/2003 | Bieg | G01B 5/008 33/1 PT |
| 6,679,275 | B2 * | 1/2004 | Heinze | B60S 3/04 134/123 |
| 7,143,464 | B2 * | 12/2006 | Brosi | B08B 5/04 15/306.1 |
| 7,234,186 | B2 * | 6/2007 | Peters | A46B 13/001 15/21.1 |
| 7,243,665 | B1 * | 7/2007 | Turner | B60S 3/042 134/100.1 |
| 7,582,164 | B1 * | 9/2009 | Krause | B24B 5/366 118/321 |
| 8,379,925 | B2 * | 2/2013 | Schilling | G06T 7/62 134/123 |
| 8,769,756 | B2 * | 7/2014 | Wentworth | B60S 3/042 118/244 |
| 2002/0002986 | A1 * | 1/2002 | Jones | B60S 3/04 134/18 |
| 2002/0117193 | A1 * | 8/2002 | Anderson | B60S 3/04 134/113 |
| 2002/0121291 | A1 * | 9/2002 | Daum | B60S 3/008 134/8 |
| 2002/0162575 | A1 * | 11/2002 | Fratello | B60S 3/04 134/18 |
| 2002/0162576 | A1 * | 11/2002 | Fratello | B60S 3/04 134/18 |
| 2004/0020519 | A1 * | 2/2004 | Taylor | B60S 3/042 134/36 |
| 2004/0035447 | A1 * | 2/2004 | Schleeter | B05B 13/04 134/32 |
| 2004/0064908 | A1 * | 4/2004 | Decker | B60S 3/04 15/53.2 |
| 2004/0065349 | A1 * | 4/2004 | Scheiter, Jr. | B60S 3/04 134/18 |
| 2004/0221878 | A1 * | 11/2004 | Johnson | B60S 3/04 134/56 R |
| 2005/0028846 | A1 * | 2/2005 | Fratello | B05B 3/0463 134/123 |
| 2005/0102777 | A1 * | 5/2005 | Johansson | B60S 3/04 15/53.1 |
| 2005/0229954 | A1 * | 10/2005 | Rosselott | B60S 3/04 134/34 |
| 2007/0009656 | A1 * | 1/2007 | Nagase | B05B 1/14 427/154 |
| 2007/0068554 | A1 * | 3/2007 | Essenburg | B60S 3/042 134/18 |
| 2007/0227558 | A1 * | 10/2007 | Chase | B08B 3/024 134/18 |
| 2007/0246088 | A1 * | 10/2007 | Rennie | B60S 3/04 134/123 |
| 2007/0289616 | A1 * | 12/2007 | McCadden | B05B 3/0463 134/123 |
| 2008/0000508 | A1 * | 1/2008 | Lee | B60S 3/004 134/123 |
| 2008/0029135 | A1 * | 2/2008 | McCadden | B05B 3/0463 134/123 |
| 2008/0178402 | A1 * | 7/2008 | Martines | B60S 3/042 15/53.2 |
| 2008/0185019 | A1 * | 8/2008 | Hodge | B08B 3/024 134/18 |
| 2009/0025159 | A1 * | 1/2009 | Rau | B08B 1/04 15/53.4 |
| 2009/0217955 | A1 * | 9/2009 | Harrell | B08B 3/02 134/56 R |
| 2009/0272409 | A1 * | 11/2009 | Petit | B60S 3/002 134/32 |
| 2010/0281638 | A1 * | 11/2010 | Reed | B60S 3/042 15/53.4 |
| 2010/0307531 | A1 * | 12/2010 | Aharonov | B60S 3/041 134/6 |
| 2011/0035889 | A1 * | 2/2011 | Keusch | B60S 3/042 15/53.4 |
| 2011/0115650 | A1 * | 5/2011 | Wimmer | B60S 3/004 340/989 |
| 2013/0186432 | A1 * | 7/2013 | Wimmer | B60S 3/042 134/6 |
| 2013/0291906 | A1 * | 11/2013 | Belanger | B60S 3/042 134/123 |
| 2013/0333127 | A1 * | 12/2013 | Langer | B60S 3/042 15/53.4 |
| 2014/0170324 | A1 * | 6/2014 | Kohonen | B05B 12/30 427/372.2 |
| 2015/0151314 | A1 * | 6/2015 | Hendricks, Sr. | B05B 9/042 118/300 |

* cited by examiner

INTELLIGENT HUB CLEANING DEVICE

CROSS-REFERENCE TO RELATED APPLICATIONS

This application is filed based upon and claims priority to Chinese Patent Application No. 201710748186.2, filed on Aug. 28, 2017, the entire contents of which are incorporated herein by reference.

BACKGROUND

The aluminum alloy hub is an important part on an automobile chassis, the manufacturing process is complex, and the production, manufacturing, detection and cleaning links need to be controlled strictly. The cleaning procedure between machining and spraying directly affects the final machining quality of the hub. The exiting hub cleaning methods roughly can be divided into manual, brush and high pressure nozzle ones. The manual cleaning method is low in degree of automation, low in efficiency and severe in working environment, and is thus not suitable for large batch production. In the process of cleaning a hub by a brush cleaning machine, the cleaning of the hub is not simple plane cleaning, the central height of the hub of each vehicle type is different, and the placing angles and positions when automobiles are cleaned are slightly different, so cleaning dead angles and difficult cleaning always exist in the conventional cleaning process. The brush cleaning method cannot realize automatic centering and then cannot effectively clean a hub, and it cannot adapt to cleaning hubs of more vehicle types, so that the vehicle cleaning cost is increased. Although the high pressure nozzle method can be used for cleaning hubs in various shapes, the cleaning area of a single nozzle is small, and a plurality of nozzles are needed to improve the cleaning efficiency, so the cost is increased. Therefore, a device which can adapt to cleaning of different types of hubs and is relatively low in cost in the disclosure has very positive practical significance.

SUMMARY

The disclosure relates to the technical fields of aluminum alloy casting and machining, and specifically relates to a hub cleaning device.

The disclosure is aimed at providing a hub cleaning device, thus overcoming the defects that the traditional hub cleaning methods cannot realize cleaning of multiple types of hubs, have cleaning dead angles, are relatively high in cost and the like.

Hub cleaning device includes a base, a mounting transition plate, a nozzle adjusting module, hub conveying modules and a work fixture.

The nozzle adjusting module is connected onto the mounting transition plate by bolt connection, and the mounting transition plate is fixed on the base by bolt connection. The work fixture is arranged at a position parallel to the base, so that the nozzle adjusting module can face the front side of a hub. The hub conveying modules are arranged on two sides of the work fixture.

The nozzle adjusting module includes a transverse drive motor, a transverse ball screw, a transverse substrate, transverse guide posts, a transverse slide block, water pipes, a longitudinal drive motor, a longitudinal substrate, a longitudinal ball screw, longitudinal guide posts, a longitudinal slide block, a nozzle mounting disc, an ultrasonic sensor and high pressure nozzles. The nozzle adjusting module is characterized in that the longitudinal substrate is fixed on the mounting transition plate by bolt connection, the longitudinal drive motor is fixed on the longitudinal substrate, the longitudinal ball screw is mounted on the longitudinal substrate, and the shaft of the longitudinal ball screw is connected with the shaft of the longitudinal drive motor. The longitudinal slide block is mounted on the nut of the longitudinal ball screw and moves together with the nut. The longitudinal guide posts penetrate through the longitudinal slide block, and are fixed on the longitudinal substrate to provide linear guiding for the longitudinal slide block. The transverse substrate is connected onto the longitudinal slide block by bolt connection. The transverse drive motor is fixed on the transverse substrate, the transverse ball screw is mounted on the transverse substrate, and the shaft of the transverse ball screw is connected with the shaft of the transverse drive motor. The transverse slide block is mounted on the nut of the transverse ball screw and moves together with the nut. The nozzle mounting disc is fixed on the transverse slide block by bolt connection, and the high pressure nozzles and the ultrasonic sensor are fixed on the nozzle mounting disc. The water pipes communicate with the high pressure nozzles, and provide high pressure water for the high pressure nozzles.

The work fixture includes a support frame, V-shaped blocks, a baffle, a pressure block, a threaded rod, a water fender and a handle. The work fixture is characterized in that the V-shaped blocks are arranged on the support frame and in two columns and used for center positioning on rims of two sides of the hub, the baffle is arranged on one side of the V-shaped blocks, and the pressure block is arranged on the other side of the V-shaped blocks and used for fixing the hub. The pressure block is adjusted via the handle, the threaded rod is fixed with the pressure block and the handle and connected with a threaded hole in the support frame by threaded connection, and thus, the pressure block can be adjusted by rotating the handle to clamp hubs of different types.

When the hub of a different type is conveyed to the work fixture by the hub conveying modules, the hub is positioned by the V-shaped blocks, and then the pressure block clamps the hub by tightening the handle. At the moment, the positions of the high pressure nozzles can be adjusted in real time via the nozzle adjusting module, so that they can adapt to different types of hubs. The ultrasonic sensor arranged on the nozzle mounting disc can feed back the distance between the high pressure nozzles and the opposite object in real time. When the distance value is within a given range, the front sides of the high pressure nozzles face the surface of the hub, and the surface needs to be cleaned. When the distance value is beyond the given range, the front sides of the high pressure nozzles do not face the surface of the hub, cleaning is not needed, and then the transverse drive motor or the longitudinal drive motor is controlled to control the high pressure nozzles to move transversely or longitudinally till facing the surface of the hub. Thus, a closed loop control is formed, and the surface that needs to be cleaned can be automatically sought. In addition, the maximum travel of the nozzle adjusting device in each moving direction is set according to the maximum size of different types of hubs to be cleaned, and thus, one hub cleaning device can realize the function of cleaning different types of hubs.

The disclosure is simple in structure and convenient to operate, and one device can complete cleaning of multiple types of hubs, thereby greatly reducing the input of enterprises on cleaning devices and saving a lot of money for the enterprises. In addition, the disclosure is high in degree of intelligence, and can automatically seek the hub surface that needs to be cleaned, thereby avoiding time and cleaner waste on the surface that does not need to be cleaned, further improving the production efficiency and reducing the cost.

BRIEF DESCRIPTION OF THE DRAWINGS

The implementation scheme of the disclosure will be described in detail below in combination with the accompanying drawings.

Figure 1:
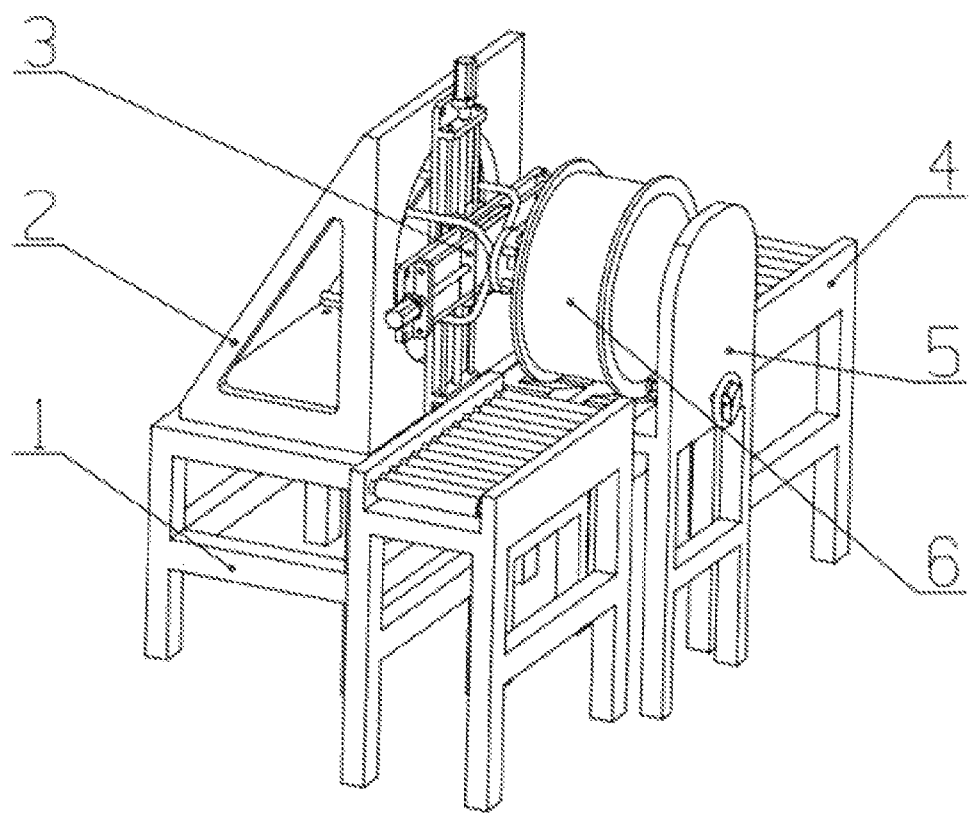
FIG. 1 is a structural schematic diagram of a hub cleaning device.
Figure 2:
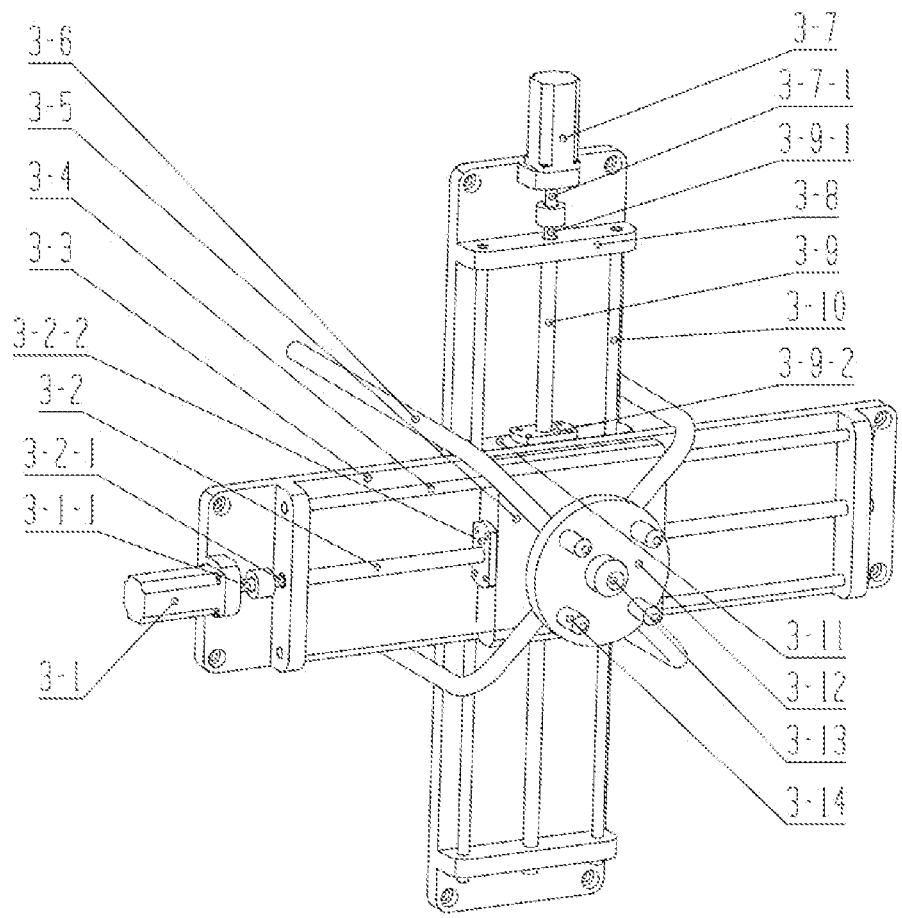
FIG. 2 is a structural schematic diagram of a nozzle adjusting device of the disclosure.
Figure 3:
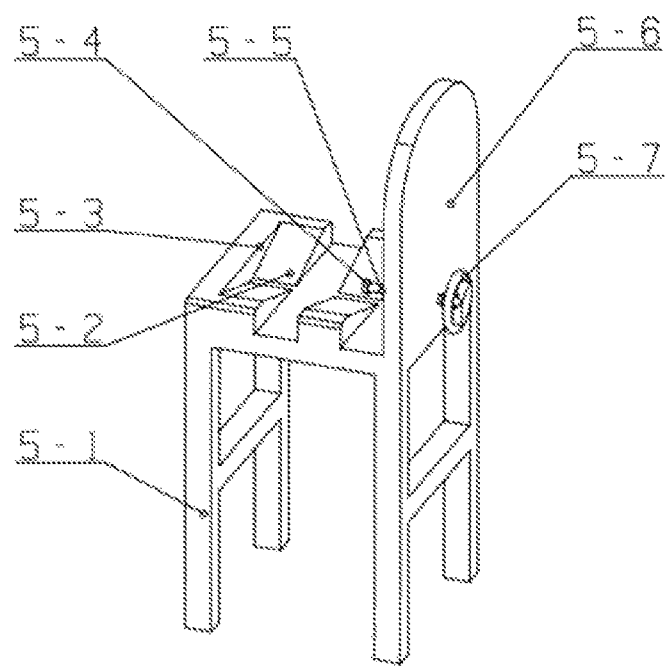
FIG. 3 is a structural schematic diagram of a work fixture of the disclosure.
Figure 4:
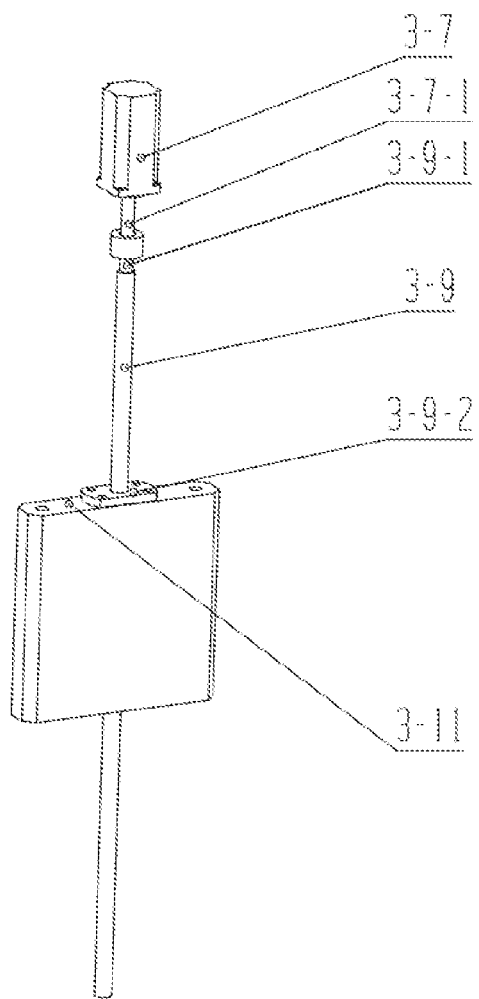
FIG. 4 is a partial schematic diagram of the longitudinal drive motor and the longitudinal ball screw.
Figure 5:
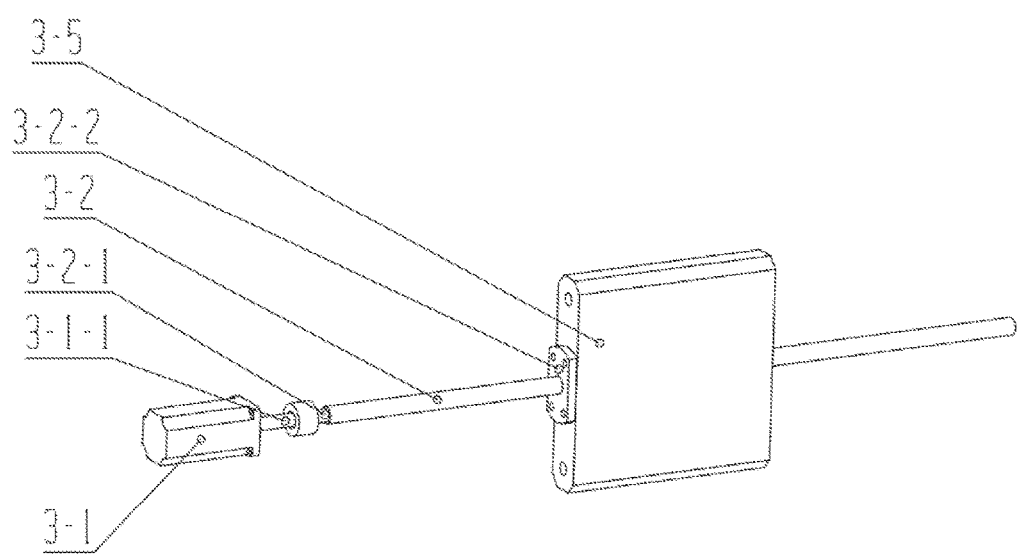
FIG. 5 is a partial schematic diagram of the transverse drive motor and the transverse ball screw.

In which, 1—base, 2—mounting transition plate, 3—nozzle adjusting module, 4—hub conveying module, 5—work fixture, 6—hub, 3-1—transverse drive motor, 3-1-1—shaft of the transverse drive motor, 3-2—transverse ball screw, 3-2-1—shaft of the transverse ball screw, 3-2-2—nut of the transverse ball screw, 3-3—transverse substrate, 3-4—transverse guide post, 3-5—transverse slide block, 3-6—water pipe, 3-7—longitudinal drive motor, 3-7-1—shaft of the longitudinal drive motor, 3-8—longitudinal substrate, 3-9—longitudinal ball screw, 3-9-1—shaft of the longitudinal ball screw, 3-9-2—nut of the longitudinal ball screw, 3-10—longitudinal guide post, 3-11—longitudinal slide block, 3-12—nozzle mounting disc, 3-13—ultrasonic sensor, 3-14—high pressure nozzle, 5-1—support frame, 5-2—V-shaped block, 5-3—baffle, 5-4—pressure block, 5-5—threaded rod, 5-6—water fender, 5-7—handle.

DETAILED DESCRIPTION

Embodiment 1

This embodiment discloses a hub cleaning device. The device includes a base 1, a mounting transition plate 2, a nozzle adjusting module 3, hub conveying modules 4 and a work fixture 5.

The nozzle adjusting module 3 is connected onto the mounting transition plate 2 by bolt connection, and the mounting transition plate 2 is fixed on the base 1 by bolt connection. The work fixture 5 is arranged at a position parallel to the base 1, so that the nozzle adjusting module 3 can face the front side of a hub 6. The hub conveying modules 4 are arranged on two sides of the work fixture 5.

The nozzle adjusting module 3 includes a transverse drive motor 3-1, a transverse ball screw 3-2, a transverse substrate 3-3, transverse guide posts 3-4, a transverse slide block 3-5, water pipes 3-6, a longitudinal drive motor 3-7, a longitudinal substrate 3-8, a longitudinal ball screw 3-9, longitudinal guide posts 3-10, a longitudinal slide block 3-11, a nozzle mounting disc 3-12, an ultrasonic sensor 3-13 and high pressure nozzles 3-14. The nozzle adjusting module 3 is characterized in that the longitudinal substrate 3-8 is fixed on the mounting transition plate 2 by bolt connection, the longitudinal drive motor 3-7 is fixed on the longitudinal substrate 3-8, the longitudinal ball screw 3-9 is mounted on the longitudinal substrate 3-8, and the shaft 3-9-1 of the longitudinal ball screw 3-9 is connected with the shaft 3-7-1 of the longitudinal drive motor 3-7. The longitudinal slide block 3-11 is mounted on the nut 3-9-2 of the longitudinal ball screw 3-9 and moves together with the nut. The longitudinal guide posts 3-10 penetrate through the longitudinal slide block 3-11, and are fixed on the longitudinal substrate 3-8 to provide linear guiding for the longitudinal slide block 3-11. The transverse substrate 3-3 is connected onto the longitudinal slide block 3-11 by bolt connection. The transverse drive motor 3-1 is fixed on the transverse substrate 3-3, the transverse ball screw 3-2 is mounted on the transverse substrate 3-3, and the shaft 3-2-1 of the transverse ball screw 3-2 is connected with the shaft 3-1-1 of the transverse drive motor 3-1. The transverse slide block 3-5 is mounted on the nut 3-2-2 of the transverse ball screw 3-2 and moves together with the nut. The nozzle mounting disc 3-12 is fixed on the transverse slide block 3-5 by bolt connection, and the high pressure nozzles 3-14 and the ultrasonic sensor 3-13 are fixed on the nozzle mounting disc 3-12. The water pipes 3-6 communicate with the high pressure nozzles 3-14, and provide high pressure water for the high pressure nozzles 3-14.

The work fixture 5 includes a support frame 5-1, V-shaped blocks 5-2, a baffle 5-3, a pressure block 5-4, a threaded rod 5-5, a water fender 5-6 and a handle 5-7. The work fixture 5 is characterized in that the V-shaped blocks 5-2 are arranged on the support frame 5-1 and in two columns and used for center positioning on rims of two sides of the hub 6, the baffle 5-3 is arranged on one side of the V-shaped blocks 5-2, and the pressure block 5-4 is arranged on the other side of the V-shaped blocks 5-2 and used for fixing the hub 6. The pressure block 5-4 is adjusted via the handle 5-7, the threaded rod 5-5 is fixed with the pressure block 5-4 and the handle 5-7 and connected with a threaded hole in the support frame 5-1 by threaded connection, and thus, the pressure block 5-4 can be adjusted by rotating the handle 5-7 to clamp hubs 6 of different types.

When the hub 6 of a different type is conveyed to the work fixture 5 by the hub conveying modules 4, the hub 6 is positioned by the V-shaped blocks 5-2, and then the pressure block 5-4 clamps the hub 6 by tightening the handle 5-7. At the moment, the positions of the high pressure nozzles 3-14 can be adjusted in real time via the nozzle adjusting module 3, so that they can adapt to different types of hubs 6. The ultrasonic sensor 3-13 arranged on the nozzle mounting disc 3-12 can feed back the distance between the high pressure nozzles 3-14 and the opposite object in real time. When the distance value is within a given range, the front sides of the high pressure nozzles 3-14 face the surface of the hub 6, and the surface needs to be cleaned. When the distance value is beyond the given range, the front sides of the high pressure nozzles 3-14 do not face the surface of the hub 6, cleaning is not needed, and then the transverse drive motor 3-1 or the longitudinal drive motor 3-7 is controlled to control the high pressure nozzles 3-14 to move transversely or longitudinally till facing the surface of the hub 6. Thus, a closed-loop control is formed, and the surface that needs to be cleaned can be automatically sought. In addition, the maximum travel of the nozzle adjusting device 3 in each moving direction is set according to the maximum size of different types of hubs 6 to be cleaned, and thus, one hub cleaning device can realize the function of cleaning different types of hubs 6.

Described above is merely a preferred embodiment of the disclosure. Changes may be made to the specific embodiment and the application scope for those of ordinary skill in the art according to the thought of the disclosure. The content of the specification should not be understood as limiting the disclosure.

The invention claimed is:

1. A hub cleaning device, including a base, a mounting transition plate, a nozzle adjusting module, hub conveying modules and a work fixture, wherein the nozzle adjusting module is connected onto the mounting transition plate, and the mounting transition plate is fixed on the base; the work fixture is arranged at such a position that the nozzle adjusting module can face a front side of a hub; one or more of the hub conveying modules are arranged on either sides of the work fixture;

the nozzle adjusting module includes a transverse drive motor, a transverse ball screw, a transverse substrate, transverse guide posts, a transverse slide block, water pipes, a longitudinal drive motor, a longitudinal substrate, a longitudinal ball screw, longitudinal guide posts, a longitudinal slide block, a nozzle mounting disc, an ultrasonic sensor and high pressure nozzles; the longitudinal substrate is fixed on the mounting transition plate, the longitudinal drive motor is fixed on the longitudinal substrate, the longitudinal ball screw is mounted on the longitudinal substrate, and a shaft of the longitudinal ball screw is connected with a shaft of the longitudinal drive motor; the longitudinal slide block is mounted on a nut of the longitudinal ball screw and moves together with the nut of the longitudinal ball screw; the longitudinal guide posts penetrate through the longitudinal slide block, and are fixed on the longitudinal substrate to provide linear guiding for the longitudinal slide block; the transverse substrate is connected onto the longitudinal slide block; the transverse drive motor is fixed on the transverse substrate, the transverse ball screw is mounted on the transverse substrate, and a shaft of the transverse ball screw is connected with a shaft of the transverse drive motor; the transverse slide block is mounted on a nut of the transverse ball screw and moves together with the nut of the transverse ball screw; the nozzle mounting disc is fixed on the transverse slide block, and the high pressure nozzles and the ultrasonic sensor are fixed on the nozzle mounting disc; each of the water pipes communicate with each of the high pressure nozzles respectively, and provide high pressure water for the high pressure nozzles;

the work fixture includes a support frame, V-shaped blocks, a baffle, a pressure block, a threaded rod, a water fender and a handle; the V-shaped blocks are arranged on the support frame and in two columns and used for center positioning on rims of two sides of the hub, and in each of the two columns there is provided one V-shaped block of the V-shaped blocks, the baffle is arranged on one side of the V-shaped blocks, and the pressure block is arranged on the other side of the V-shaped blocks and used for fixing the hub; the pressure block is adjusted via the handle, and the threaded rod is fixed with the pressure block and the handle and connected with a threaded hole in the support frame.

* * * * *